United States Patent [19]
Ridenour

[11] 3,930,298
[45] Jan. 6, 1976

[54] METHOD OF FORMING A TUBE FITTING ASSEMBLY

[75] Inventor: Ralph G. Ridenour, Mansfield, Ohio

[73] Assignee: Universal Refrigeration, Inc., Mansfield, Ohio

[22] Filed: Mar. 3, 1975

[21] Appl. No.: 554,971

Related U.S. Application Data

[63] Continuation of Ser. No. 425,561, Dec. 17, 1973, abandoned.

[52] U.S. Cl. ............................... 29/523; 285/382.5
[51] Int. Cl.² .................. B21D 39/00; B23P 11/02
[58] Field of Search .......... 29/157.4, 421, 520, 522, 29/523, 507; 285/382.4, 382.5 X, 222, 334.4

[56] References Cited
UNITED STATES PATENTS

| 528,167 | 10/1894 | Jones ............................. | 285/382.5 |
|---|---|---|---|
| 1,817,854 | 8/1931 | Sorensen ...................... | 29/157 R X |
| 1,971,117 | 8/1934 | Mossberg ..................... | 29/523 |
| 2,477,676 | 8/1949 | Woodling ..................... | 29/523 UX |
| 2,779,279 | 1/1957 | Maiwurm .................... | 29/421 UX |
| 3,092,404 | 6/1963 | MacWilliam ................ | 285/334.4 |
| 3,428,338 | 2/1969 | Corwin ......................... | 29/157.4 X |
| 3,497,946 | 3/1970 | Tingley ......................... | 285/382.5 X |
| 3,534,988 | 10/1970 | Lindsey ......................... | 29/507 X |
| 3,687,495 | 8/1972 | Sakamoto et al. ............ | 285/382.5 X |
| 3,778,090 | 12/1973 | Tobin ............................. | 285/382.5 X |

*Primary Examiner*—Charlie T. Moon
*Attorney, Agent, or Firm*—Woodling, Krost, Granger & Rust

[57] ABSTRACT

The method of forming a tube fitting assembly is disclosed in a fitting having a first bore through a portion of the fitting and a second bore larger than the first bore and concentric with and through a portion of the first bore. A tubing having a diameter substantially equal to the first bore is engaged against an inside surface of the fitting defined by the end of the first bore. Relative movement between the fitting and the tube deforms the tubing wall to engage the first and second bores and to form an annular bead of the tubing wall outside of the fitting assembly. The bead is swaged into engagement with an outside surface of the fitting surrounding the second bore. The foregoing is merely a resume of one general application, is not a complete discussion of all principles of operation or applications, and is not to be construed as a limitation on the scope of the claimed subject matter.

8 Claims, 6 Drawing Figures

U.S. Patent    Jan. 6, 1976    3,930,298
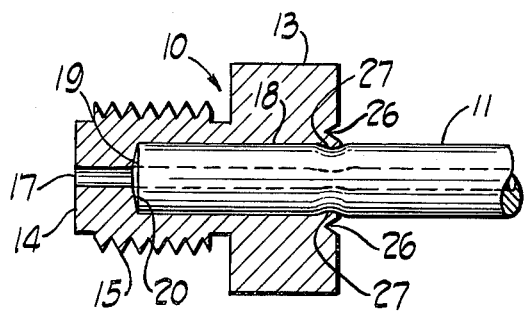
Fig. 1
PRIOR ART
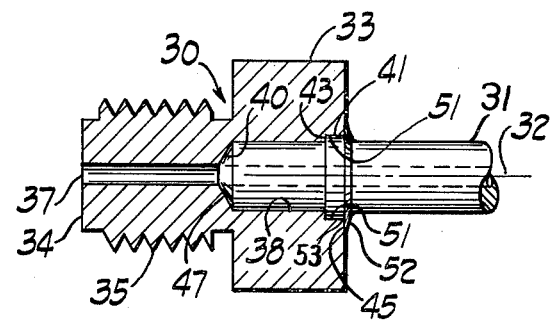
Fig. 2
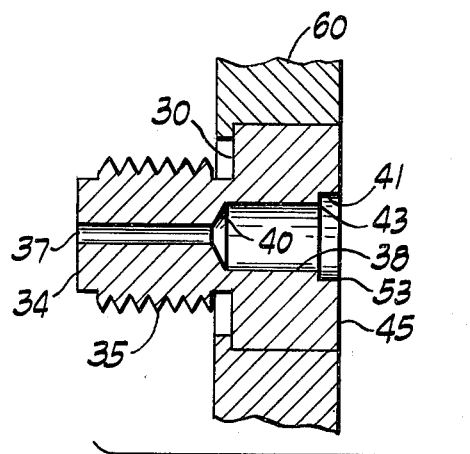
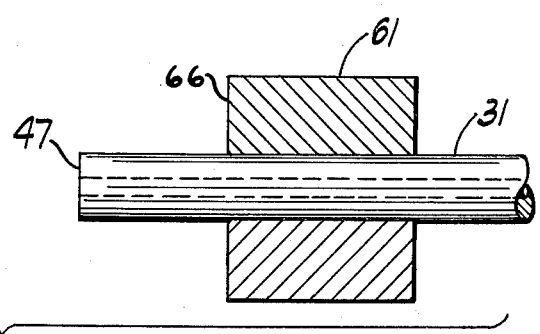
Fig. 3
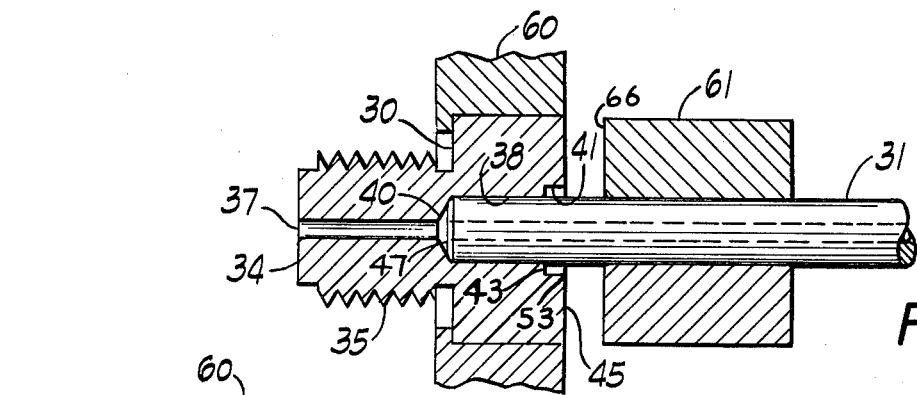
Fig. 4
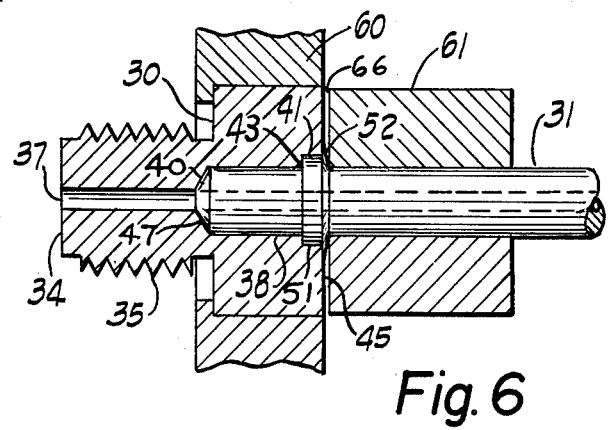
Fig. 5          Fig. 6

METHOD OF FORMING A TUBE FITTING ASSEMBLY

This is a continuation of application Ser. No. 425,561, filed Dec. 17, 1973, now abandoned.

BACKGROUND OF THE INVENTION

1. Field of the Invention

This invention relates to metalworking and more particularly to a mechanical process by flaring an inserted tube end or expanding a part in an aperture or radial expanding an internal fitted tube.

2. Description of the Prior Art

The prior art of metalworking has known many types of tube and fitting assemblies wherein a tube and fitting are joined without the aid of threads, nuts, and the like. Generally, the tube or fitting is deformed or swaged to seal the tube to the fitting.

In many cases, the swaging or deformation process causes a cold welding of the tube and fitting due to the extremely high pressures exerted between the tube and fitting. Cold welding was generally accomplished on softer materials such as aluminum and the like. One disadvantage of cold welding is that the weld only takes place when the materials were freshly cut or prepared. If aluminum parts were stored for any substantial period of time then no cold weld would form due to aluminum oxide on the surface.

The prior art has joined tube and fitting assemblies by inserting a tube into a fitting and using a flaring tool to expand the tubing wall to engage the fitting. For example, a fitting bore may have a recess wherein the tubing wall is radially expanded by a flaring tool to engage the bore recess to form a seal between the tube and the fitting. This process was suitable for larger tubings but was impractical for small tubings where a flaring tool cannot be easily inserted.

The prior art has used a ring stake process to join a small tube to a fitting. The ring stake process incorporates a fitting having a single bore substantially the same diameter as the tube. The tube is inserted into the bore and a die swages an outside surface of the fitting surrounding the bore to cause a deformation of the fitting to engage the tubing wall. This process did not require any internal flaring tool and provided a satisfactory low-pressure seal so long as no torsional strain was applied between the tube and the fitting. However, the seal could be destroyed if a torque was applied between the tube and the fitting about the axis of the tube. Consequently, the ring stake tube fitting assembly proved unreliable for many applications.

Therefore, an object of this invention is to provide a method of making a tube fitting assembly which requires no cold welding.

Another object of this invention is to provide a method of making a tube fitting assembly which requires no internal flaring tools.

Another object of this invention is to provide a method of making a tube fitting assembly which can be formed in a one-step operation.

Another object of this invention is to provide a method of making a tube fitting assembly which has a high torsional strength.

Another object of this invention is to provide a method of making a tube fitting assembly which is capable of high pressure sealing.

Another object of this invention is to provide a method of making a tube fitting assembly which is reliable.

SUMMARY OF THE INVENTION

The invention may be incorporated into a method of forming an assembly of a tubing and a fitting wherein the fitting has a first orifice through a portion of the fitting and a second orifice through a portion of the first orifice, the fitting having an outside surface surrounding the second orifice comprising, the steps of: holding the fitting; holding the tubing; inserting the tubing into the first orifice; relatively moving the tubing and the fitting to deform the tubing wall into engagement with one of the orifices and to be extended outwardly from the fitting; and forcing the tubing extended outwardly into engagement with the outside surface of the fitting.

Other objects and a fuller understanding of the invention may be had by referring to the following description and claims, taken in conjunction with the accompanying drawings.

BRIEF DESCRIPTION OF THE DRAWINGS

FIG. 1 is a side sectional view of the prior art ring stake tube fitting assembly;

FIG. 2 is a side sectional view of a novel tube fitting assembly and which is the preferred embodiment; and, FIGS. 3–6 illustrate a method of forming the tube fitting assembly shown in FIG. 2.

DESCRIPTION OF THE PREFERRED EMBODIMENT

FIG. 1 is a sectional view of a prior art tube fitting assembly comprising a fitting 10 and a tube 11 formed in a ring stake configuration. The fitting 10 comprises a body 13 shown as cylindrical but may be hexagonal or the like and a cylindrical tip 14 having threads 15. The cylindrical tip 14 has an internal aperture 17 concentric with the axis of the cylindrical tip 14 whereas the body 13 has a bore 18 concentric with the axis of the cylindrical tip 14. The fitting may be mounted by the threads 15 to direct a flammable gas through aperture 17 in a vertical direction to form a pilot light burner for a gas appliance.

The tube 11 is substantially the same diameter as the bore 18 and is inserted therein to have a tubing end 19 engage an inside surface 20 defined by the end of the bore 18. The tube 11 is sealed to the fitting 10 by deforming the fitting 10 in a manner commonly referred to as ring staking. In ring staking, an annular ring concentric with the axis of the tip 14 is struck against an outside surface 26 of the fitting 10 surrounding the bore 18. The ring staking causes deformation of the bore 18 of fitting 10 to form a projection 27 which engages the tube wall of the tube 11. The projection 27 makes a low-pressure, gas-tight, seal between the tube 11 and the fitting 10.

One disadvantage of this prior art design is the limited torsional strength of the tube 11 relative to the fitting 10. A rotation of the tube 11 relative to the fitting 10 will destroy the seal at projection 27. The ring stake provides sufficient longitudinal strength between the tube 11 and fitting 10, but is deficient relative to torque exerted on the tubing. Any rotation between the tube 11 and the fitting 10 will destroy the seal. The ring stake assembly has been widely used in the art irrespective of the aforementioned disadvantages because it was the most economical pressure seal between a small tubing and a fitting. This invention has solved the aforementioned disadvantages of the ring stake assembly by providing a novel method of making a tube and fitting assembly shown in FIGS. 2–6.

FIG. 2 is a side sectional view of the tube fitting invention. The assembly comprises a fitting 30 and a tubing 31. The fitting 30 has a body 33 shown as a cylinder and a cylindrical tip 34 coaxial with axis 32. The tip 34 has mounting threads 35 and a coaxial aperture 37. The body 33 has a first coaxial bore 38 extending through a portion of the fitting 30. The bore 38 defines an internal surface 40 of the fitting 30 at the end of the bore. A second coaxial bore 41 extends through a portion of the first bore 38. A first shoulder 43 is formed at the junction of the first and second bores 38 and 41. The fitting 30 has an outside surface 45 surrounding the second bore 41.

The tube 31 is substantially equal in diameter to the bore 38 and engages the first bore 38 with a tubing end 47 contacting the inside surface 40 of the fitting. The tubing wall has a first deformed portion 51 wherein the tubing wall is radially expanded about the axis of the tube to engage the first shoulder 43 and the region between the first and second bores 38 and 41. The first deformed portion 51 also engages the second bore 41 to completely fill the first and second bores except for the central opening of the tube 31. The assembly has a second deformed portion 52 which engages a second shoulder 53 formed between the outside surface 45 of the fitting 33 and the second bore 41. The second deformed portion 52 engages the outside surface 45 surrounding the second bore 41. In the prior art ring stake shown in FIG. 1, the fitting 10 is deformed to engage the tube 11. In the present invention illustrated in FIG. 2, the tubing wall is deformed to engage the fitting 30. Whereas the prior art ring stake had only a single annular projection 27 to secure the tube 11 to the fitting 10, the present invention has several areas of engagement between the tube 31 and the fitting 30. The tube 31 engages the fitting 30 at the internal surface 40, the first bore 38, the first shoulder 43, and the region between the first and second bores, the second bore 41, the second shoulder 53, and the outside surface 45. Deformation of the tubing wall of the tubing 31 at each of these areas provide a seal which is many times more effective than the prior art ring stake.

In experimental tests on one-eighth inch O.D. aluminum tubing for making gas pilot burners, consistent tube fitting assemblies were made which are pressure tested at 100 pounds per square inch (p.s.i.) whereas the manufacturer's specifications for such a fitting require only one pound per square inch. In addition, the mechanical strength of this fitting has been demonstrated in that if the tube 31 is twisted about the tube axis one inch from the fitting 30, the tube 31 will break after several rotations prior to breaking the seal. The invention provides a tube fitting assembly where the seal between the tube and the fitting is stronger than the tube. The aforementioned pressure and mechanical strength of this novel tube fitting assembly is a substantial contribution to the tube fitting art. The assembly enhances the safety of gas appliances due to the 100 to 1 pressure safety factor and a mechanical seal which is stronger than the tubing itself.

The tube fitting assembly comprises a fitting 30 having a first orifice shown as a bore 38 which may be tapered or curved and extending through at least a portion of the fitting. The fitting has a second orifice shown as a second bore 41 which may also be tapered or curved and through a portion of the first orifice. The assembly includes a tubing 31 occupying the first and second orifices 38 and 41 and having a first deformed portion 51 of the tubing wall engaging one of the first and second orifices 38 and 41. A second deformed portion 52 of the tube wall engages an outside surface 45 of the fitting 30 surrounding one of the first and second orifices 38 and 41. In FIG. 2, the second orifice or bore has a larger cross-sectional area than the first bore. It is apparent that the first and second orifices and tubing may have a cross-sectional shape of a polygon and need not necessarily have a circular cross-sectional shape. Likewise, the embodiment illustrates a simplified arrangement wherein the aperture 37, the first bore 38, and the second bore 41 are coaxial with one another with the tubing 31 being substantially equal in diameter to the first bore 38. These simplified modifications need not necessarily be applied to practice this invention. The deformed portions of the tubing wall need not necessarily be radially expanded but may be contracted along a tapered or curved orifice and/or an expansion about another orifice.

The invention illustrated in FIG. 2 resides in the method of making the tube fitting assembly shown in FIGS. 3–6. The method of forming the tube fitting assembly requires the fitting to have a first orifice 38 through at least a portion of the fitting and a second orifice 41 through a portion of the first orifice 38. The fitting has an outside surface 45 surrounding the second orifice 41. The method of forming the assembly comprises the steps of holding the fitting by a holding die 60 and holding the tubing 31 by a holding die 61. The holding die 61 holds the tube 31 at a distance from the tube end 47 which is greater than the length of the first bore 38. The first bore 38 includes the distance from the outside surface 45 to the inside surface 40 of the fitting 30. This greater length is required due to the contraction of length of the tube 31 to form the enlargement of the tubing wall to engage with the fitting. The method includes inserting the tubing 31 into the first orifice 38 as shown in FIG. 4, to abut the internal surface 40 of the fitting. The process requires relatively moving the tubing 31 and the fitting 30 to deform the tubing wall into engagement with one of the orifices and to be extended outwardly from the fitting. This step is illustrated in FIG. 5 wherein the relative movement of the tube radially expands the tubing wall to form a bead or extended portion 65 and engages the second bore 41 and extends outwardly from the fitting 30. The radial expansion of the tubing wall engages substantially all of the first and second bores of the fitting 30. The final step of the method is shown in FIG. 6 and includes forcing the tube extended portion 65 into engagement with the outside surface 45 of the fitting to form the second deformed portion 52. This step is accomplished by swaging with the front surface 66 of the die 61. Although the invention is illustrated as swaging the extended portion with the surface 66, another swaging tool may be applied to accomplish this final step.

The novel method of making a tube fitting assembly has been set forth in FIGS. 2–6. The advancement of this invention over the prior art can best be appreciated in view of the pressure-tightness and mechanical strength of the assembly. Much of this strength is attributed from present understanding to the second deformed portion 52. The assembly has a substantial increase in mechanical and pressure strength over the prior art even though requiring only a relatively small modification to the structure.

This invention has been perfected on 0.125 through 0.500 inch O.D. soft aluminum tubing having a 0.035 inch wall thickness. The first bore 38 has a diameter of a No. 25 drill, about 0.1495 inches. The first bore 38 has an approximate length from the outside surface 45 to the internal surface 40 of three-sixteenths of an inch and may be made with a No. 30 drill leaving a tapered internal surface 40. The second bore 41 has an approximate length from the outside surface 45 to the first shoulder 43 of 1/32 of an inch. The tubing 31 is grasped by the die 61 spaced from the tubing end 47 at a distance of 1/16 of an inch greater than the length of the first bore from the outside surface 45 to the internal surface 40. This extra 1/16 of an inch is used to fill the first and second bores and engage with the outside surface 45 of the fitting 30. The head portion 65 of the tubing wall shown in FIG. 5 will have a length from the front surface 66 of die 61 to the first shoulder 43 of approximately 0.040 inches with approximately 0.015 inches extending between the outside surface 45 and the front surface 66 of die 61. This excess material will be forced by the front surface 66 of die 61 to establish the second deformed portion 52 in swaging engagement with the outside surface 45 of the fitting 30. Fittings made in accordance with the above specifications have been tested to 100 pounds per square inch with no detectable leaks. Such fittings as required by the gas appliance manufacturing industry requires a one pound leak test.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and materials thereof may be resorted to without departing from the spirit and the scope of the invention as hereinafter claimed.

What is claimed is:

1. A method of forming an assembly of a tubing and a fitting wherein the fitting has a first orifice through a portion of the fitting and a second orifice through a portion of the first orifice with one of the orifices defining an inside surface of the fitting at the end thereof, the fitting having an outside surface surrounding the second orifice comprising, the steps of:
   holding the fitting;
   holding the tubing;
   inserting the tubing into the first orifice of the fitting;
   abutting an end of the tubing against the inside surface of the fitting;
   relatively moving the held tubing axially toward the held fitting to radially expand the tubing wall into engagement with one of the orifices and to radially expand the tubing wall to extend outwardly from the fitting in proximity to the outside surface of the fitting;
   and forcing the tubing extended outwardly from the fitting to engage the outside surface of the fitting surrounding the second orifice.

2. A method of forming an assembly of a tubing and a fitting wherein the fitting has an aperture and a first bore concentric with the aperture and through a portion of the fitting with the first bore defining an inside surface of the fitting at the end of the first bore, a second bore concentric with the aperture and through a portion of the first bore and the fitting having an outside surface surrounding the second bore and wherein the tubing is substantially equal in diameter to the first bore, comprising, the steps of:
   holding the fitting;
   holding the tubing at a distance from the tubing end which is greater than the length of the first bore;
   inserting the tubing into the first bore;
   abutting the inserted end of the tubing against the inside surface of the fitting;
   relatively moving the held tubing axially toward the held fitting to radially expand the tubing wall to engage the second bore and to radially expand the tubing wall to extend outwardly from the fitting;
   and forcing the tubing extended outwardly from the fitting to engage the outside surface of the fitting.

3. A method as set forth in claim 2 wherein the step of relatively moving the tubing radially expands the tubing wall to engage substantially all of the first and second bores.

4. A method as set forth in claim 2 wherein the step of forcing the tubing extended outwardly includes swaging the tubing extended outwardly with a tool.

5. A method of forming an assembly of a tubing and a fitting wherein the fitting has a first orifice through a portion of the fitting with the first orifice defining an inside surface of the fitting at the end of the first orifice, a second orifice concentric with and through a portion of the first orifice and the fitting having an outside surface surrounding the second orifice comprising, the steps of:
   holding the fitting;
   holding the tubing;
   inserting the tubing into the first orifice;
   abutting the inserted end of the tubing against the inside surface of the fitting;
   relatively moving the held tubing axially toward the held fitting to radially expand the tubing wall forming a bead which engages the wall of the second orifice and extends outside of the fitting;
   and forcing the tubing bead extending outside of the fitting to engage the outside surface of the fitting.

6. A method as set forth in claim 5, wherein the step of forcing the tubing bead includes flattening at least a portion of the bead extending outside of the fitting against the outside surface of the fitting.

7. A method of forming an assembly of a tubing and a fitting wherein the fitting has first and second walls defining first and second concentric orifices, the fitting having an inside surface defining an end of the first orifice and an outside surface adjacent an end of the second orifice with the second orifice extending through only a portion of the first orifice, and with the second wall having a greater periphery than the first wall, and a junction wall defining a junction between said first orifice and the inner end of said second orifice, comprising the steps of:
   holding the fitting with a fitting holder;
   holding the tubing with a tubing holder at a distance from the tubing end which is greater than the distance from the inside surface to the outside surface of the fitting;
   inserting the tubing into the first orifice;
   abutting the inserted end of the tubing against the inside surface of the fitting;

axially contracting the tubing length between the tubing end and tubing holder by relative movement between the tubing holder and the fitting holder and forming a bead from material of the contracted tubing length within the second orifice;

and radially expanding the bead through continued contraction of the tubing length to engage the expanded bead with the wall of the second orifice to seal the tubing to the fitting at one of the junction wall and second wall.

8. A method of forming an assembly of a tubing and a fitting wherein the tubing has an internal diameter and an external diameter and wherein the fitting has an aperture having an aperture diameter commensurate with the internal diameter of the tubing and extending through the fitting, a first wall defining a first orifice through a portion of the fitting and having a first orifice diameter commensurate with the external diameter of the tubing with an inside surface of the fitting defining an end of the first orifice, and a second wall defining a second orifice concentric with and through a portion of the first orifice and having a second orifice diameter which is greater than the first orifice diameter and an outside surface of the fitting adjacent an end of the second orifice, comprising the steps of:

holding the fitting with a fitting holder;

holding the tubing with a tubing holder at a distance from the tubing end which is greater than the distance from the inside surface to the outside surface of the fitting;

inserting the tubing into the first orifice;

abutting the inserted end of the tubing against the inside surface of the fitting;

axially contracting the tubing length between the tubing end and tubing holder by axial relative movement between the tubing holder and the fitting holder forming a bead from the contracted tubing length within the second orifice;

and radially expanding the bead through additional contraction of the tubing length by continued relative movement between the tubing holder and the fitting holder to substantially fill and to engage the expanded bead with the wall of the second orifice to seal the tubing to the fitting.

* * * * *